US012040127B2

(12) United States Patent
Inaba

(10) Patent No.: US 12,040,127 B2
(45) Date of Patent: Jul. 16, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kazuhiro Inaba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 562 days.

(21) Appl. No.: 17/288,344

(22) PCT Filed: Oct. 9, 2019

(86) PCT No.: PCT/JP2019/039922
§ 371 (c)(1),
(2) Date: Apr. 23, 2021

(87) PCT Pub. No.: WO2020/085098
PCT Pub. Date: Apr. 30, 2020

(65) Prior Publication Data

US 2021/0383962 A1 Dec. 9, 2021

(30) Foreign Application Priority Data

Oct. 26, 2018 (JP) ................................ 2018-202370

(51) Int. Cl.
*H01F 27/02* (2006.01)
*H01F 27/255* (2006.01)
(Continued)

(52) U.S. Cl.
CPC ........... *H01F 37/00* (2013.01); *H01F 27/022* (2013.01); *H01F 27/025* (2013.01); *H01F 27/255* (2013.01); *H01F 27/324* (2013.01)

(58) Field of Classification Search
CPC .... H01F 27/022; H01F 27/025; H01F 27/255; H01F 27/324
(Continued)

(56) References Cited

U.S. PATENT DOCUMENTS 3,684,991 A * 8/1972 Trump .................... H01F 30/12
336/84 R
5,138,292 A * 8/1992 Forster ...................... H01F 7/06
335/278
(Continued)

FOREIGN PATENT DOCUMENTS

JP 2005-183885 A 7/2005

OTHER PUBLICATIONS

International Search Report, Application No. PCT/JP2019/039922, mailed Jan. 7, 2020. ISA/Japan Patent Office.

*Primary Examiner* — Shawki S Ismail
*Assistant Examiner* — Joselito S. Baisa
(74) *Attorney, Agent, or Firm* — Honigman LLP

(57) ABSTRACT

A reactor includes an assembly of a coil and a magnetic core; a case; and a sealing resin portion filling the case and sealing at least a portion of the assembly. The case has an inner bottom surface, and a pair of coil facing surfaces that face side surfaces of the coil. The pair of coil facing surfaces have inclined surfaces that incline away from each other in a direction from the inner bottom surface side to an opposite side to the inner bottom surface. The coil includes a first winding portion disposed on the inner bottom surface side, and a second winding portion disposed opposite of the inner bottom surface with respect to the first winding portion. The
(Continued)

first winding portion and the second winding portion are in a vertical arrangement and are parallel with each other. The second winding portion is wider than the first winding portion.

13 Claims, 4 Drawing Sheets

(51) Int. Cl.
*H01F 27/32* (2006.01)
*H01F 37/00* (2006.01)

(58) Field of Classification Search
USPC .......................................................... 336/83
See application file for complete search history.

(56) References Cited

U.S. PATENT DOCUMENTS

| | | | | |
|---|---|---|---|---|
| 5,587,694 | A * | 12/1996 | Minato | H01F 41/02 336/212 |
| 7,362,201 | B2 * | 4/2008 | Saegusa | H01F 41/005 336/92 |
| 9,343,223 | B2 * | 5/2016 | Suzuki | H01F 27/306 |
| 10,283,255 | B2 | 5/2019 | Yoshikawa | |
| 2002/0014941 | A1 * | 2/2002 | Yoshioka | H01F 27/266 336/184 |
| 2012/0194311 | A1 * | 8/2012 | Suzuki | H01F 27/266 336/92 |
| 2019/0131052 | A1 | 5/2019 | Kusawake et al. | |

* cited by examiner

REACTOR

CROSS-REFERENCE TO RELATED APPLICATIONS

This application is the U.S. national stage of PCT/JP2019/039922 filed on Oct. 9, 2019, which claims priority of Japanese Patent Application No. JP 2018-202370 filed on Oct. 26, 2018, the contents of which are incorporated herein.

TECHNICAL FIELD

The present disclosure relates to a reactor.

BACKGROUND

A reactor according to JP 2016-207701A includes an assembly of a coil and a magnetic core, a case, and a sealing resin portion. The case houses the assembly. This case includes a bottom plate portion on which the assembly is placed, and a side wall portion that surrounds the outer periphery of the assembly. The bottom portion and the side wall portion are formed integrally with each other. The coil includes a pair of winding portions. Each of the pair of winding portions has a rectangular shape. The pair of winding portions have the same width and the same height. The pair of winding portions are arranged side by side on the bottom portion in the same plane such that the axes thereof are parallel with each other. In the following description, the side-by-side arrangement in the same plane may be referred to as a horizontal arrangement. The magnetic core includes inner core portions that are respectively disposed inside the winding portions, and outer core portions that are disposed outside the winding portions. The sealing resin portion is filled into the case to seal the assembly.

Depending on the installation target of the reactor, the installation space for the reactor may be too small to dispose the pair of winding portions in a horizontal arrangement. To install the reactor in a small installation space, it is conceivable to stack the pair of winding portions in a direction orthogonal to the installation surface so that the axes of the pair of winding portions are parallel to each other. In the following description, the arrangement in which the pair of winding portions are stacked in a direction orthogonal to the installation surface may be referred to as a vertical arrangement.

However, if the pair of winding portions that have the same width are arranged on the bottom portion of the vase in a vertical arrangement, the distance between the side surface of the upper winding portion and the side wall portion of the case that faces the side surface is greater than the distance between the side surface of the lower winding portion and the side wall portion of the case. The inner wall surfaces of the side wall portion of the case are usually provided with inclined surfaces that are inclined away from each other in a direction from the inner bottom surface of the bottom plate portion of the case to the opposite side. The case is typically manufactured through mold casting such as die casting or injection molding. The inclined surfaces of the inner wall surfaces are formed by transferring a draft provided in the mold to release the case from the mold at the time of manufacturing the case. The depth of a case for housing the pair of winding portions disposed in a vertical arrangement is deeper than the depth of the case for housing the pair of winding portions disposed in a horizontal arrangement. The deeper the case, the longer the distance between the side surface of the upper winding portion and the inner wall surface of the case.

As a result of an increase in the distance between the side surface of the upper winding portion and the inner wall surface of the case, heat is less likely to be dissipated from the upper winding portion via the inner wall surface of the case. That is to say, the lower winding portion is likely to be cooled, and the upper winding portion is less likely to be cooled. As a result, when the temperature of the upper winding portion is higher than that of the lower winding portion, the amount of loss of the reactor is large.

Therefore, one object of the present disclosure is to provide a low loss reactor that requires a small installation area.

SUMMARY

A reactor according to the present disclosure is a reactor including: an assembly of a coil and a magnetic core; a case that houses the assembly; and a sealing resin portion that is filled into the case to seal at least a portion of the assembly. The case has an inner bottom surface on which the assembly is placed, and a pair of coil facing surfaces that face side surfaces of the coil, the pair of coil facing surfaces respectively have inclined surfaces that are inclined away from each other in a direction from the inner bottom surface side to an opposite side to the inner bottom surface. The coil includes a first winding portion that is disposed on the inner bottom surface side, and a second winding portion that is disposed on an opposite side of the inner bottom surface with respect to the first winding portion, the first winding portion and the second winding portion are disposed in a vertical arrangement such that axes thereof are parallel with each other, and the second winding portion has a greater width than the first winding portion.

Advantageous Effects of Disclosure

The reactor according to the present disclosure is a low loss reactor that requires a small installation area.

DETAILED DESCRIPTION OF PREFERRED EMBODIMENTS

Figure 1:
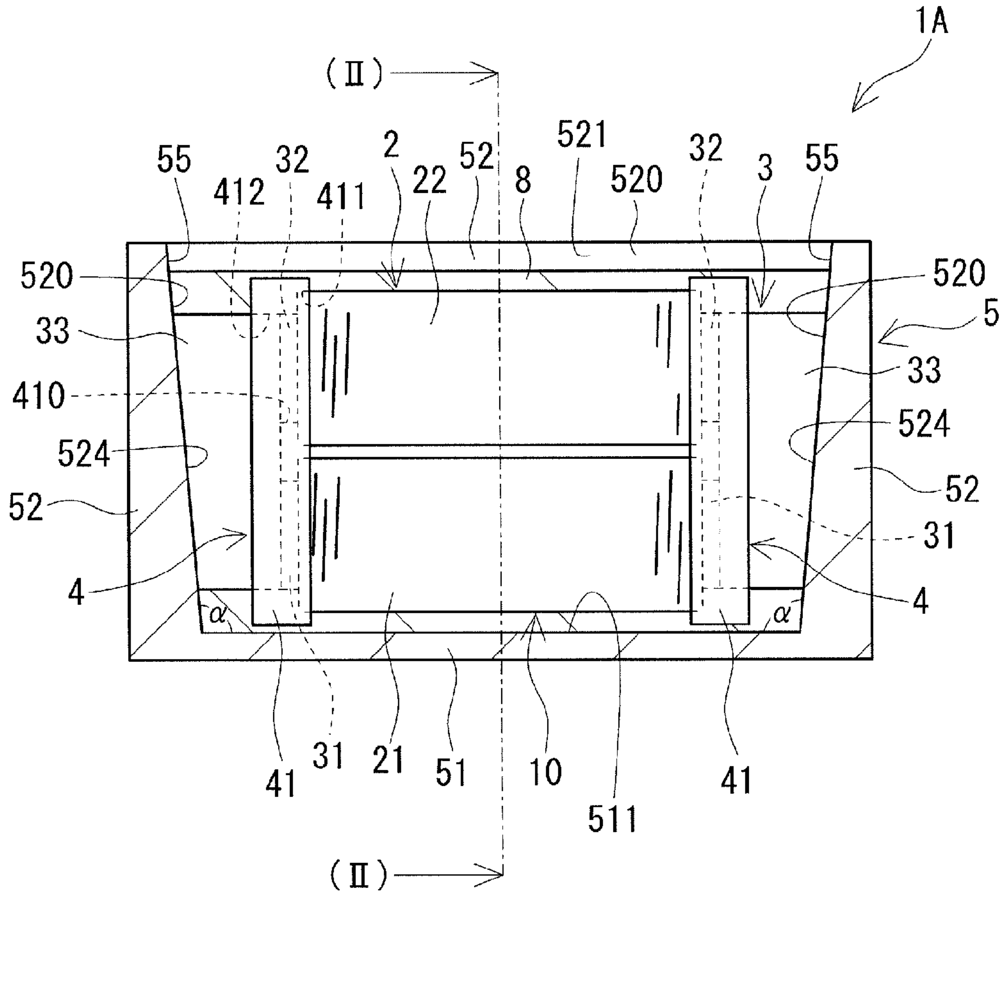
FIG. 1 is a side view showing an outline of a reactor according to a first embodiment.

First, embodiments of the present disclosure are listed and described.

A reactor according to one aspect of the present disclosure is a reactor including: an assembly of a coil and a magnetic core; a case that houses the assembly; and a sealing resin portion that is filled into the case to seal at least a portion of the assembly. The case has an inner bottom surface on which the assembly is placed, and a pair of coil facing surfaces that face side surfaces of the coil, the pair of coil facing surfaces respectively have inclined surfaces that are inclined away from each other in a direction from the inner bottom surface side to an opposite side to the inner bottom surface. The coil includes a first winding portion that is disposed on the inner bottom surface side, and a second winding portion that is disposed on an opposite side of the inner bottom surface with respect to the first winding portion, the first winding portion and the second winding portion are disposed in a vertical arrangement such that axes thereof are parallel with each other, and the second winding portion has a greater width than the first winding portion.

In the above-described reactor, the first winding portion and the second winding portion are disposed in a vertical arrangement, and therefore the installation area is small compared to when the first winding portion and the second winding portion are disposed in a horizontal arrangement. This is because the length of the assembly in the direction orthogonal to both the direction in which the first winding portion and the second winding portion are arranged in parallel and the axial direction of the coil is shorter than the length of the assembly in the direction in which the first winding portion and the second winding portion are arranged in parallel.

Also, the above-described reactor is a low loss reactor. When the first winding portion and the second winding portion each have a constant height, as a result of setting the second winding portion so as to have a greater width than the first winding portion, the distance between the side surfaces of the second winding portion and the inclined surfaces that face the side surfaces is more likely to be small compared to when the first winding portion and the second winding portion have the same width. Therefore, heat from the second winding portion is can easily be dissipated. Therefore, the first winding portion and the second winding portion are likely to be uniformly cooled via the coil facing surface of the case. As a result of the first winding portion and the second winding portion being uniformly cooled in this way, the maximum temperature of the coil is likely to be lowered. As a result of the maximum temperature of the coil being lowered, the amount of loss of the reactor is likely to be reduced. The definition of the width of the winding portions will be described later.

Furthermore, with the above-described reactor, it is possible to reduce the costs. This is because, by only setting the width of the second winding portion to be greater than the width of the first winding portion as described above, it is possible to make heat from the second winding portion be more easily dissipated, and it is unnecessary to form the sealing resin portion with a resin or the like that has a high thermal conductivity. A resin having a high thermal conductivity can easily dissipate heat from the second winding portion even if the distance between the side surfaces of the second winding portion and the inclined surfaces is relatively large, but the costs are relatively high.

In the above-described reactor, when the facing intervals between the inclined surfaces of the case are the same, the dead space in the case can easily be reduced.

In one aspect of the above-described reactor, the inner bottom surface may be a flat surface, end surfaces of the first winding portion and the second winding portion may each have a rectangular frame shape, and may each have a pair of case facing sides that face the inclined surfaces and extend in a vertical direction, and a pair of coupling sides that couple respective proximal ends and respective distal ends of the pair of case facing sides to each other, and the pair of coupling sides may be parallel with the inner bottom surface.

With the above-described configuration, the distance between the side surfaces of the first winding portion and the inclined surfaces in the width direction gradually increases in a direction from the inner bottom surface side to the opposite side. Similarly, the distance between the side surfaces of the second winding portion and the inclined surfaces in the width direction gradually increases in a direction from the inner bottom surface side to the opposite side. It is possible to make the distance between the side surfaces of the first winding portion and the inclined surfaces in the width direction and the distance between the side surfaces of the second winding portion and the inclined surfaces uniform, from the inner bottom surface side to the opposite side. Therefore, the second winding portion and the first winding portion are likely to be uniformly cooled via the coil facing surfaces of the case.

In one aspect of the above-described reactor, end surfaces of the first winding portion and the second winding portion may each have a rectangular frame shape, and may each have a case facing side that faces, and is parallel with, one of the inclined surfaces, and another case facing side that faces, and is not parallel with, the other of the inclined surfaces.

The above-described reactor produces an even smaller amount of loss.

It is possible to make the distance between one of the side surfaces of the first winding portion and one of the inclined surfaces uniform, from the inner bottom surface side to the opposite side. Similarly, it is possible to make the distance between one of the side surfaces of the second winding portion and one of the inclined surfaces uniform, from the inner bottom surface side to the opposite side. Also, with the above-described rector, it is possible to make the distance between one of the side surfaces of the first winding portion and one of the inclined surfaces and the distance between one of the side surfaces of the second winding portion and one of the inclined surfaces uniform. Therefore, in the above-described reactor, heat from the second winding portion can easily be dissipated from one of the side surfaces thereof. Furthermore, with the above-described reactor, it is possible to bring one of the side surfaces of the first winding portion and one of the side surfaces of the second winding portion into surface contact with one of the inclined surfaces, when necessary. Therefore, in the above-described reactor, heat from the second winding portion can even more easily be dissipated from one of the side surfaces thereof.

Also, the distance between the other of the side surfaces of the first winding portion and the other of the inclined surfaces in the width direction gradually increases in a direction from the inner bottom surface side to the opposite side. Similarly, the distance between the other of the side surfaces of the second winding portion and the other of the inclined surfaces in the width direction gradually increases in a direction from the inner bottom surface side to the opposite side. The distance between the side surfaces of the first winding portion and the inclined surfaces in the width direction and the distance between the side surfaces of the second winding portion and the inclined surfaces can be made uniform in a direction from the inner bottom surface side to the opposite side thereto. Therefore, in the above-described reactor, heat from the second winding portion can easily be dissipated from the other of the side surfaces thereof as well. Therefore, in the above-described reactor, the first winding portion and the second winding portion are likely to be uniformly cooled via the coil facing surfaces of the case.

In one aspect of the above-described reactor, end surfaces of the first winding portion and the second winding portion may each have a trapezoidal frame shape, and may each have a pair of case facing sides that face, and are parallel with, the inclined surfaces.

The above-described reactor produces an even lower loss. It is possible to make the distance between one of the side surfaces of the first winding portion and one of the inclined surfaces and the distance between the other of the side surfaces of the first winding portion and the other of the inclined surfaces uniform, from the inner bottom surface side to the opposite side. Similarly, it is possible to make the distance between one of the side surfaces of the second winding portion and one of the inclined surfaces and the distance between the other of the side surfaces of the second winding portion and the other of the inclined surfaces uniform, from the inner bottom surface side to the opposite side. Also, it is possible to make the distance between the side surfaces of the first winding portion and the inclined surfaces and the distance between the side surfaces of the second winding portion and the inclined surfaces uniform. Therefore, the first winding portion and the second winding portion are likely to be uniformly cooled via the coil facing surfaces of the case.

In one aspect of the above-described reactor, the magnetic core may include a first inner core portion and a second inner core portion that are respectively disposed inside the first winding portion and the second winding portion, cross-sectional shapes of the first inner core portion and the second inner core portion cut along cross sections that are orthogonal to magnetic flux in the inner core portions may respectively match shapes of inner circumferences of the first winding portion and the second winding portion, and the second inner core portion may have a greater width than the first inner core portion.

The above-described cross-sectional shape of the first inner core matches the shape of the inner circumference of the first winding portion, and therefore the distance between the first winding portion and the first inner core portion is likely to be uniform in the circumferential direction of the first inner core portion. Similarly, the distance between the second winding portion and the second inner core portion is likely to be uniform in the circumferential direction of the second inner core portion.

As a result of the second inner core portion having a greater width than the first inner core portion, the second winding portion has a greater width than the first winding portion, and the distance between the second winding portion and the second inner core portion is likely to be small compared to when the second inner core portion and the first inner core portion have the same width. Also, the distance between the first winding portion and the first inner core portion and the distance between the second winding portion and the second inner core portion are likely to be the same. Furthermore, if the facing intervals between the inclined surfaces are the same, the width of the second inner core portion can be large compared to when the first winding portion and the second winding portion have the same width. Therefore, with the above-described reactor, the inductance can be increased.

In one aspect of the above-described reactor, an angle formed by the inner bottom surface and each of the inclined surfaces may be no less than 91° and no greater than 95°.

When the aforementioned angle is no less than 91°, the releasability of the case is high. The case is typically manufactured through mold casting such as die casting or injection molding. The inclined surfaces are formed by transferring a draft provided in the mold to release the case from the mold at the time of manufacturing the case. When the aforementioned angle is no less than 91°, if the first winding portion and the second winding portion have the same width and the first winding portion and the second winding portion are disposed in a vertical arrangement, the distance between the side surfaces of the second winding portion on the upper side and the inclined surfaces is likely to be greater than the distance between the side surfaces of the second winding portion on the lower side and the inclined surfaces. However, by setting the width of the second winding portion to be greater than the width of the first winding portion, it is possible to reduce the distance between the side surfaces of the second winding portion on the upper side and the inclined surfaces. Therefore, heat can easily be dissipated from the second winding portion via the side wall portion of the case even in the case of the vertical arrangement. When the aforementioned angle is no greater than 95°, the angle is not excessively large. Therefore, the difference between the width of the first winding portion and the width of the second winding portion is not excessively large. Therefore, it is unlikely that the heat generation properties of the second winding portion and the first winding portion vary from each other.

The following describes details of the embodiments of the present disclosure with reference to the drawings. The same reference numerals in the figures indicate objects with the same name.

First Embodiment

Reactor

Figure 2:
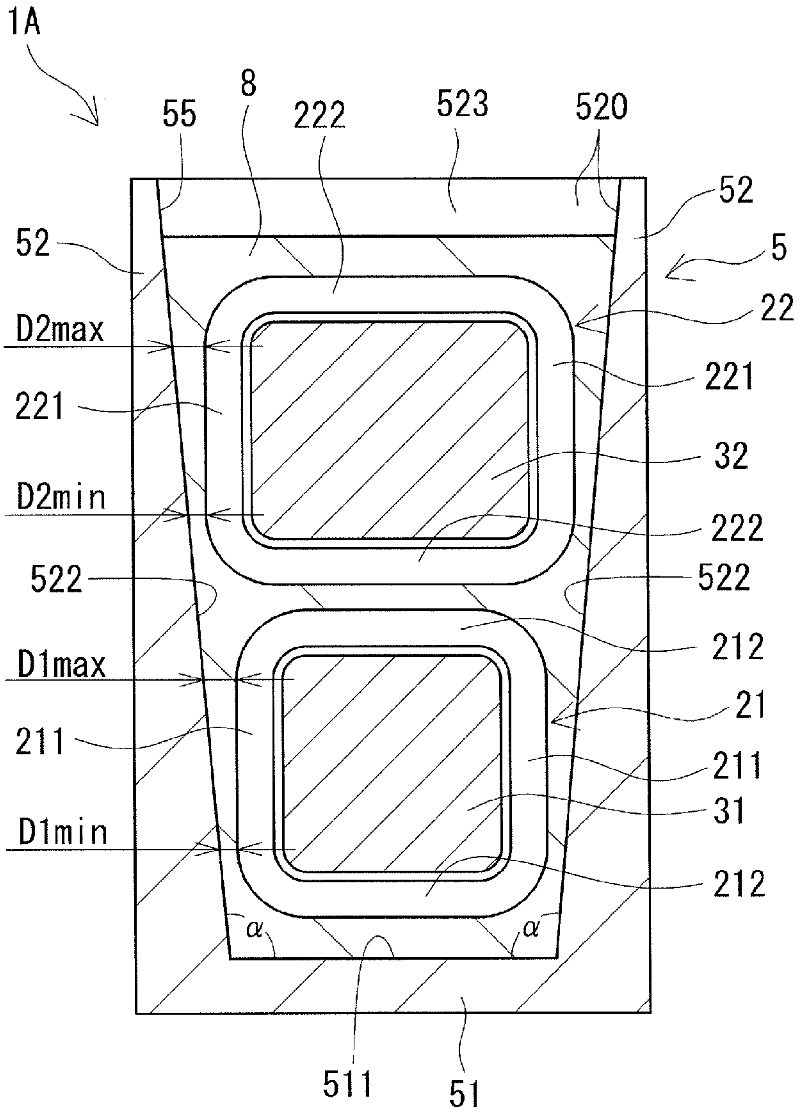
FIG. 2 is a cross-sectional view showing an outline of the reactor cut along a (II)-(II) cutting line in FIG. 1.

A reactor 1A according to a first embodiment will be described with reference to FIGS. 1 and 2. The reactor 1A includes an assembly 10 that is a combination of a coil 2 and a magnetic core 3, a case 5, and a sealing resin portion 8. The case 5 includes a bottom plate portion 51 on which the assembly 10 is to be placed, and a side wall portion 52 that surrounds the outer periphery of the assembly 10. In the side wall portion 52, a pair of coil facing surfaces 521 that face the side surfaces of the coil 2 respectively have inclined surfaces 522 that are inclined from the bottom plate portion 51 side toward the opposite side of the bottom plate portion 51 so as to separate away from each other. The sealing resin portion 8 is filled into the case 5 to seal at least a portion of the assembly 10. The coil 2 includes a first winding portion 21 and a second winding portion 22 that are formed by winding wires. The first winding portion 21 is placed on the bottom plate portion 51 side. The second winding portion 22 is placed on the opposite side of the bottom plate portion 51 with respect to the first winding portion 21. The first winding portion 21 and the second winding portion 22 are disposed in a vertical arrangement such that the axes thereof are parallel with each other. One feature of the reactor 1A is that the second winding portion 22 has a greater width than the first winding portion 21. The following describes main characteristic portions of the reactor 1A, the configurations of portions related to the characteristic portions, main effects, and components, in that order. Also, in the following description, it is assumed that the bottom plate portion 51 of the case 5 is on the bottom side, and the opposite side to the bottom plate portion 51 is the top side. That is to say, a direction that is parallel with this top-bottom direction is the depth direction of the case 5. In FIGS. 1 and 2, the upper side of the drawing sheets correspond to the top side, and the lower side of the drawing sheets correspond to the bottom side. A direction that is parallel with this top-bottom direction is referred to as a height direction or a vertical direction. A direction that is orthogonal to this height direction and the axial direction of the coil 2 is referred to as a width direction. In FIG. 2, the left-right direction of the drawing sheet is the width direction.

Configurations of Main Characteristic Portions and Related Portions Case

The case 5 houses the assembly 10. The case 5 can protect the assembly 10 from mechanical factors and from the external environment. By being protected from the external environment, the assembly 10 is improved in the corrosion resistance properties thereof. In addition, the case 5 can dissipate heat from the assembly 10. The case 5 is a bottomed tubular container. The case 5 includes a bottom plate portion 51 and a side wall portion 52. For the sake of illustration, the side wall portion on the near side of the drawing sheet is omitted from FIG. 1. In this example, the bottom plate portion 51 and the side wall portion 52 are formed integrally with each other. In this example, the bottom plate portion 51 and the side wall portion 52 are formed integrally with each other. In such a case, the bottom plate portion 51 and the side wall portion 52 may be integrated with each other by being screwed to each other. An opening 55 is formed on the upper end side of the side wall portion 52. The internal space surrounded by the bottom plate portion 51 and the side wall portion 52 has a shape and a size that are sufficient for housing the entire assembly 10.

Bottom Plate Portion

The bottom plate portion 51 has an inner bottom surface 511 on which the assembly 10 is to be placed and an outer bottom surface that is to be installed onto an installation target such as a cooling base. The installation target is omitted from the drawings. The bottom plate portion 51 has a rectangular flat plate shape. The inner bottom surface 511 and the outer bottom surface are flat surfaces in this example.

Side Wall Portion

The side wall portion 52 surrounds the outer periphery of the assembly 10. The side wall portion 52 is provided so as to stand on the periphery of the bottom plate portion 51. The shape of the side wall portion 52 is a rectangular frame shape in this example. The height of the side wall portion 52 is longer than the height of the assembly 10. An inner wall surface 520 of the side wall portion 52 has four surfaces, namely the pair of coil facing surfaces 521 and a pair of core facing surfaces 523 (FIG. 1). The pair of coil facing surfaces 521 face each other. The pair of core facing surfaces 523 face each other. The direction in which the pair of coil facing surfaces 521 face each other and the direction in which the pair of core facing surfaces 523 face each other are orthogonal to each other.

Coil Facing Surfaces

The coil facing surfaces 521 face side surfaces of the coil 2. That is to say, the coil facing surfaces 521 face the first winding portion 21 and the second winding portion 22. The side surfaces of the first winding portion 21 and the second winding portion 22 refer to portions of the outer peripheral surfaces of the first winding portion 21 and the second winding portion 22, the portions being located at positions in the width direction of the first winding portion 21 and the second winding portion 22. The coil facing surfaces 521 respectively have inclined surfaces 522 that are inclined away from each other in the direction from the inner bottom surface 511 side to the opening 55 side of the case 5. Grooves into which end surface members 41 are fitted in the depth direction of the case 5 may be formed in the inclined surfaces 522 of the coil facing surfaces 521 at positions that face the end surface members 41 of a holding member 4 described below. The grooves are omitted from the drawings. If the grooves are formed, it is easier to position the assembly 10 including the coil 2, the magnetic core 3, and the holding member 4, relative to the case 5.

Core Facing Surfaces

The core facing surfaces 523 face outer end surfaces of the outer core portions 33. The outer end surfaces of the outer core portions 33 refer to surfaces of the outer core portions 33 on the opposite side to the first inner core portion 31 and the second inner core portion 32. As with the coil facing surfaces 521, the core facing surfaces 523 respectively have inclined surfaces 524 that are inclined away from each other in the direction from the inner bottom surface 511 side to the opening 55 side of the case 5.

The case 5 is typically manufactured through mold casting such as die casting or injection molding. The inclined surfaces 522 and 524 are formed by transferring a draft provided in the mold to release the case 5 from the mold at the time of manufacturing the case 5.

Inclination Angle

It is preferable that the angle (angle $\alpha$) formed by each of the inclined surfaces 522 and 524 and the inner bottom surface 511 is no less than 91° and no greater than 95° (FIGS. 1 and 2). In FIGS. 1 and 2, for the sake of illustration, the inclination angle of the inclined surfaces 522 and the inclined surfaces 524 is exaggerated. In this example, all of the angles formed by the inclined surfaces 522 and 524 and the inner bottom surface 511 are assumed to be the same. Note that the angle formed by the inclined surfaces 522 and the inner bottom surface 511 and the angle formed by the inclined surfaces 524 and the inner bottom surface 511 may be different from each other.

When the angle $\alpha$ is no less than 91°, the releasability of the case 5 is high. When the aforementioned angle $\alpha$ is no less than 91°, if the first winding portion 21 and the second winding portion 22 have the same width, and the first winding portion 21 and the second winding portion 22 are stacked in a direction orthogonal to the inner bottom surface 511 such that the axes thereof are parallel with each other, the distance between the side surface of the second winding portion 22 on the upper side and the inclined surfaces 522 is likely to be greater than the distance between the side surface of the second winding portion 22 on the lower side and the inclined surfaces 522. Here, the direction orthogonal to the inner bottom surface 511 is the depth direction of the case 5. In the following description, stacking in the depth direction of the case 5 may be referred to as vertical arrangement. However, as described below, by setting the width of the second winding portion 22 to be greater than the width of the first winding portion 21, it is possible to reduce the distance between the side surfaces of the second winding portion 22 on the upper side and the inclined surfaces 522. Therefore, heat can easily be dissipated from the second winding portion 22 via the side wall portion 52 of the case 5 even in the case of the aforementioned vertical arrangement. When the aforementioned angle $\alpha$ is no greater than 95°, the angle is not excessively large. Therefore, the difference between the width of the first winding portion 21 and the width of the second winding portion 22 is not excessively large. Therefore, it is unlikely that the heat generation properties of the second winding portion 22 and the first winding portion 21 vary from each other.

Material

Examples of the material of the case 5 include non-magnetic metals and non-metallic materials. Examples of non-magnetic metals include aluminum and an alloy thereof, magnesium and an alloy thereof, copper and an alloy thereof, silver and an alloy thereof, and austenitic stainless steel. The thermal conductivity of these non-magnetic metals is relatively high. Therefore, it is possible to use the case 5 as a heat dissipation path, and heat generated in the assembly 10 can be efficiently dissipated to the installation target such as a cooling base. Therefore, the reactor 1A can improve heat dissipation properties. When the case 5 is formed of a metal, die casting can be preferably used as the method for forming the case 5. Examples of non-metallic materials include resins such as a polybutylene terephthalate (PBT) resin, a urethane resin, a polyphenylene sulfide (PPS) resin, and an acrylonitrile-butadiene-styrene (ABS) resin. Such non-metal materials generally have excellent electrical insulation properties. Therefore, such non-metal materials can improve insulation between the coil 2 and the case 5. Such non-metallic materials are lighter than the aforementioned metallic materials, and can make the reactor 1A lighter. The aforementioned resins may contain a ceramic filler. Examples of ceramic fillers include alumina and silica. A resin containing such a ceramic filler has excellent heat dissipation properties and electrical insulation properties. When the case 5 is formed of a resin, injection molding can be preferably used as the method for forming the case 5. When the bottom plate portion 51 and the side wall portion 52 are to be individually molded, the bottom plate portion 51 and the side wall portion 52 may be formed of different materials.

Coil

The first winding portion 21 and the second winding portion 22 provided in the coil 2 are hollow tubular members formed by spirally winding separate wires. In the present embodiment, the first winding portion 21 and the second winding portion 22 are square tubular members. Note that the first winding portion 21 and the second winding portion 22 may be formed from a single wire. The first winding portion 21 and the second winding portion 22 are electrically connected to each other. How they are electrically connected will be described later.

A coated wire that has an insulating coating on the outer circumference of a conductor wire may be used as each of the wires constituting the first winding portion 21 and the second winding portion 22. Examples of the material of the conductor wire include copper, aluminum, and magnesium, and an alloy thereof. Examples of the type of the conductor wire include a flat wire and a round wire. Examples of the insulating coating include enamel. Typical examples of enamel include polyamide-imide. A coated flat wire of which the conductor wire is a copper flat wire and the insulating coating is formed of enamel is used as each of the wires in this example. The first winding portion 21 and the second winding portion 22 are each constituted by an edgewise coil in which the coated flat wire is wound edgewise. The wires of the first winding portion 21 and the second winding portion 22 have the same cross-sectional areas in this example. The winding directions of the first winding portion 21 and the second winding portion 22 are the same in this example. The number of turns of the first winding portion 21 and that of the second winding portion 22 are the same. Note that the cross-sectional area of the wire and the number of turns may be different between the first winding portion 21 and the second winding portion 22.

The arrangement of the first winding portion 21 and the second winding portion 22 is a vertical arrangement in the depth direction of the case 5, in which the axes thereof are parallel with each other. The aforementioned "parallel" does not include a case where they are in the same straight line. The first winding portion 21 is placed on the bottom plate portion 51 side. The second winding portion 22 is placed upward of the first winding portion 21, i.e., on the opposite side of the bottom plate portion 51 with respect to the first winding portion 21.

The shape of the end surfaces of the first winding portion 21 and the second winding portion 22 is a rectangular frame shape (FIG. 2). The "rectangular frame shape" mentioned here may be a square frame shape. The corners of the first winding portion 21 and the second winding portion 22 are rounded. Note that the shape of the end surfaces of the first winding portion 21 and the second winding portion 22 may be a trapezoidal frame shape or the like. Examples of the trapezoidal frame shape include the isosceles trapezoidal frame shape described below (FIG. 4) and a right-angled trapezoidal frame shape. The right-angled trapezoidal frame shape is not shown in the drawings.

The end surface of the first winding portion 21 is shaped so as to include a pair of case facing sides 211 and a pair of coupling sides 212 (FIG. 2). The pair of case facing sides 211 face the inclined surfaces 522 of the coil facing surfaces 521 of the side wall portion 52. The pair of coupling sides 212 couple the respective proximal ends and the respective distal ends of the pair of case facing sides 211 to each other. In this example, the pair of case facing sides 211 are parallel with the depth direction of the case 5. The coupling sides 212 are parallel with the inner bottom surface 511 of the bottom plate portion 51. The coupling sides 212 extend in the width direction of the case 5. Similarly, the end surface of the second winding portion 22 is shaped so as to include a pair of case facing sides 221 and a pair of coupling sides 222 (FIG. 2). The pair of case facing sides 221 face the inclined surfaces 522 of the coil facing surfaces 521 of the side wall portion 52. The pair of coupling sides 222 couple the respective proximal ends and the respective distal ends of the pair of case facing sides 221 to each other. In this example, the pair of case facing sides 221 are parallel with the depth direction of the case 5. The coupling sides 222 are parallel with the inner bottom surface 511 of the bottom plate portion 51. The coupling sides 222 extend in the width direction of the case 5.

The first winding portion 21 and the second winding portion 22 have the same height in this example. That is to say, the pair of case facing sides 211 of the first winding portion 21 and the pair of case facing sides 221 of the second winding portion 22 have the same length. The height of the first winding portion 21 and the height of the second winding portion 22 may be different from each other.

The width of the second winding portion 22 is greater than the width of the first winding portion 21. That is to say, the length of the pair of coupling sides 222 of the second winding portion 22 is greater than the length of the pair of coupling sides 212 of the first winding portion 21. In FIG. 2, for the sake of illustration, the magnitude relationship between the width of the first winding portion 21 and the width of the second winding portion 22 is exaggerated. It is preferable that the width of the second winding portion 22 satisfies both of the conditions (1) and (2) show below.

Condition 1

The minimum distance D2min between the side surfaces of the second winding portion 22 and the inclined surfaces 522 in the width direction is no greater than the minimum distance D1min between the side surfaces of the first winding portion 21 and the inclined surfaces 522 in the width direction.

Condition 2

The maximum distance D2max between the side surfaces of the second winding portion 22 and the inclined surfaces 522 in the width direction is no greater than the maximum distance D1max between the side surfaces of the first winding portion 21 and the inclined surfaces 522 in the width direction.

When the width of the second winding portion 22 satisfies both of the conditions (1) and (2), heat from the second winding portion 22 can easily be dissipated from the side wall portion 52 of the case 5. Therefore, the first winding portion 21 and the second winding portion 22 are likely to be uniformly cooled via the side wall portion 52 of the case 5. As a result of the first winding portion 21 and the second winding portion 22 being uniformly cooled, the maximum temperature of the coil 2 is likely to be lowered. As a result of the maximum temperature of the coil 2 being lowered, the amount of loss of the reactor 1A is likely to be reduced. In particular, regarding the width of the second winding portion 22, it is preferable that the aforementioned minimum distance D2min is less than the aforementioned minimum distance D1min, and the aforementioned maximum distance D2max is less than the aforementioned maximum distance D1max. This is because, with such a configuration, heat can effectively be dissipated from the second winding portion 22. In particular, when the cross-sectional areas of the conductors of the second winding portion 22 and the first winding portion 21 are the same, the second winding portion 22 has a higher resistance and is more easily generate heat than the first winding portion 21. This is because the second winding portion 22 has a greater width than the first winding portion 21, and the total length of the conductor of the second winding portion 22 is longer than the total length of the conductor of the first winding portion 21. Therefore, when the aforementioned minimum distance D2min is less than the aforementioned minimum distance D1min, and the aforementioned maximum distance D2max is less than the aforementioned maximum distance D1max, heat from the second winding portion 22 that is more likely to generate heat can effectively be dissipated. Therefore, the second winding portion 22 and the first winding portion 21 are likely to be uniformly cooled.

In this example, the distance between the side surfaces of the first winding portion 21 and the inclined surfaces 522 in the width direction gradually increases in a direction from the inner bottom surface 511 side to the opening 55 side. Similarly, the distance between the side surfaces of the second winding portion 22 and the inclined surfaces 522 in the width direction gradually increases in a direction from the inner bottom surface 511 side to the opening 55 side.

That is to say, the aforementioned minimum distance D1min is the distance between the side surfaces of the first winding portion 21 on the inner bottom surface 511 side and the inclined surfaces 522 in the width direction. The aforementioned maximum distance D1max is the distance between the side surfaces of the first winding portion 21 on the opening 55 side and the inclined surfaces 522 in the width direction. Similarly, the aforementioned minimum distance D2min is the distance between the side surfaces of the second winding portion 22 on the inner bottom surface 511 side and the inclined surfaces 522 in the width direction. The aforementioned maximum distance D2max is the distance between the side surfaces of the second winding portion 22 on the opening 55 side and the inclined surfaces 522 in the width direction. The aforementioned minimum distance D1min and the aforementioned minimum distance D2min are substantially the same. The aforementioned maximum distance D1max and the aforementioned maximum distance D2max are substantially the same. Therefore, the second winding portion 22 and the first winding portion 21 are likely to be uniformly cooled via the side wall portion 52 of the case 5.

Magnetic Core

The magnetic core 3 includes a first inner core portion 31, a second inner core portion 32, and a pair of outer core portions 33 (FIG. 1).

The first inner core portion 31 and the second inner core portion 32 are respectively disposed inside the first winding portion 21 and the second winding portion 22. The first inner core portion 31 and the second inner core portion 32 are portions that extend in the axial direction of the first winding portion 21 and the second winding portion 22, of the magnetic core 3. In this example, the end portions of the magnetic core 3 in the axial direction of the first winding portion 21 and the second winding portion 22 protrude outward from the first winding portion 21 and the second winding portion 22, and the protruding portions are portions of the first inner core portion 31 and the second inner core portion 32. The pair of outer core portions 33 are arranged outside the first winding portion 21 and the second winding portion 22. That is to say, the outer core portions 33 are portions where the coil 2 is not provided, protrude from the coil 2, and are exposed to the outside from the coil 2.

The magnetic core 3 is formed by bringing the end surfaces of the first inner core portion 31 and the second inner core portion 32 into contact with the inner end surfaces of the outer core portions 33 so as to have ring shape. That is to say, the pair of outer core portions 33 are arranged so as to sandwich the first inner core portion 31 and the second inner core portion 32 that are arranged apart from each other. Due to the first inner core portion 31, the second inner core portion 32, and the pair of outer core portions 33, a closed magnetic path is formed when the coil 2 is excited.

Inner Core Portions

It is preferable that the shape of the first inner core portion 31 and the shape of the second inner core portion 32 respectively match the shape of the inner circumference of the first winding portion 21 and the shape of the inner circumference of the second winding portion 22. This is because such a configuration makes it easier for the distance between the inner circumferential surface of the first winding portion 21 and the outer circumferential surface of the first inner core portion 31 to be made uniform in the circumferential direction of the first inner core portion 31. This is also because such a configuration makes it easier for the distance between the inner circumferential surface of the second winding portion 22 and the outer circumferential surface of the second inner core portion 32 to be made uniform in the circumferential direction of the second inner core portion 32. In this example, the first inner core portion 31 and the second inner core portion 32 have a rectangular parallelepiped shape. The corners of the first inner core portion 31 and the second inner core portion 32 are rounded so as to match the inner circumferential surfaces at the corners of the first winding portion 21 and the second winding portion 22.

In this example, the first inner core portion 31 and the second inner core portion 32 have the same height. It is preferable that the second inner core portion 32 has a greater width than the first inner core portion 31. This is because, if the second inner core portion 32 has a greater width than the first inner core portion 31, the second winding portion 22 has a greater width than the first winding portion 21, and therefore the distance between the inner circumferential surface of the second winding portion 22 and the outer circumferential surface of the second inner core portion 32 is likely to be small compared to when the second inner core portion 32 and the first inner core portion 31 have the same width. Also, the distance between the inner circumferential surface of the first winding portion 21 and the outer circumferential surface of the first inner core portion 31 is likely to be the same as the distance between the inner circumferential surface of the second winding portion 22 and the outer circumferential surface of the second inner core portion 32. Furthermore, if the facing intervals between the inclined surfaces 522 are the same, the width of the second inner core portion 32 can be large compared to when the first winding portion 21 and the second winding portion 22 have the same width. Therefore, it is possible to increase the inductance. The width of the first inner core portion 31 and the width of the second inner core portion 32 in this example are set so that the distance between the inner circumferential surface of the first winding portion 21 and the outer circumferential surface of the first inner core portion 31 and the distance between the inner circumferential surface of the second winding portion 22 and the outer circumferential surface of the second inner core portion 32 are the same.

The first inner core portion 31 and the second inner core portion 32 in this example are each formed of one columnar core piece. Each core piece is formed without a gap. The core pieces have a length that spans substantially the entire length of the first winding portion 21 and the second winding portion 22 in the axial direction thereof. Note that the first inner core portion 31 and the second inner core portion 32 may each be formed of a stacked member in which a plurality of columnar core pieces and gaps are stacked in the axial direction of the coil 2.

Outer Core Portions

Examples of the shape of the outer core portions 33 include a rectangular parallelepiped shape and a quadrangular pyramid shape. The rectangular parallelepiped shape is a rectangular column member in which the outer end surface, the side surfaces, the upper surface, and the lower surface are all rectangular in each of the outer core portions 33. The upper surface and the lower surface have the same area. Examples of the quadrangular pyramid shape include the shape of a rectangular column member in which the outer end surface, the upper surface, and the lower surface are rectangular and the side surfaces are right-angled trapezoidal in each of the outer core portions 33. Another example is the shape of a rectangular column member in which the outer end surface is isosceles trapezoidal, and the side surfaces, the upper surface, and the lower surface are rectangular, in each of the outer core portions 33. Another example is the shape of a rectangular column member in which the outer end surface is isosceles trapezoidal, the side surfaces are right-angled trapezoidal, and the upper surface and the lower surface are rectangular, in each of the outer core portions 33. The rectangular column member in which the outer end surfaces of each outer core portion 33 have an isosceles trapezoid shape can preferably be used when the width of the second inner core portion 32 is greater than the width of the first inner core portion 31. In the outer core portions 33 that have a quadrangular pyramid shape, the area of the upper surface is greater than the area of the lower surface.

The outer core portions 33 in this example have a quadrangular pyramid shape. Specifically, examples of the quadrangular pyramid shape include the shape of a rectangular column member in which the outer end surface, the upper surface, and the lower surface are rectangular and the side surfaces are right-angled trapezoidal in each of the outer core portions 33 (FIG. 1). It is preferable that the outer end surfaces of each of the outer core portions 33 are constituted by surfaces that are parallel with the inclined surfaces 524 of the core facing surfaces 523. This is because such a configuration makes it possible to bring the outer end surfaces of the outer core portions 33 and the inclined surfaces 524 of the core facing surfaces 523 into surface contact. As a result of such surface contact, heat from the outer core portions 33 is more likely to be conducted to the side wall portion 52 of the case 5. Therefore, the heat dissipation properties of the magnetic core 3 can be improved. In addition, it is possible to press the pair of outer core portions 33 in a direction in which they come close to each other. Therefore, the magnetic core 3 is less likely to be displaced relative to the case 5.

In this example, the upper surfaces of the outer core portions 33 are substantially flush with the upper surface of the second inner core portion 32. In this example, the lower surfaces of the outer core portions 33 are substantially flush with the lower surface of the first inner core portion 31. Note that the upper surfaces of the outer core portions 33 may be located at positions higher than the upper surface of the second inner core portion 32. The lower surfaces of the outer core portions 33 may be located at positions lower than the lower surface of the first inner core portion 31.

Sealing Resin Portion

The sealing resin portion 8 is filled into the case 5 to cover at least a portion of the assembly 10. The sealing resin portion 8 has various functions such as conducting heat from the assembly 10 to the case 5, protecting the assembly 10 from mechanical factors and from the external environment, improving the corrosion resistance properties of the assembly 10, improving electrical insulation between the assembly 10 and the case 5, unifying the assembly 10, and improving the strength and rigidity of the reactor 1A as a result of integrating the assembly 10 and the case 5 with each other.

The sealing resin portion 8 in this example is substantially entirely embedded in the assembly 10. The sealing resin portion 8 includes a portion that is interposed between the coil 2 and the case 5. Specifically, the sealing resin portion 8 is interposed between the lower surface of the first winding portion 21 and the inner bottom surface 511 of the bottom plate portion 51, between the side surfaces of the first winding portion 21 and the coil facing surfaces 521 of the side wall portion 52, and the side surfaces of the second winding portion 22 and the coil facing surfaces 521. In addition, the sealing resin portion 8 is interposed between the upper surface of the first winding portion 21 and the lower surface of the second winding portion 22. Heat from the first winding portion 21 and the second winding portion 22 is more likely to be conducted to the case 5 via the sealing resin portion 8.

Examples of the material of the sealing resin portion 8 include a thermosetting resin and a thermoplastic resin. Examples of thermosetting resins include an epoxy resin, a urethane resin, a silicone resin, and an unsaturated polyester resin. Examples of thermoplastic resins include a PPS resin. These resins may contain the above-described ceramic filler or the like.

Actions and Effects of Main Characteristic Portions of Reactor

The reactor 1A according to the first embodiment can achieve the following effects.

The first winding portion 21 and the second winding portion 22 are disposed in a vertical arrangement, and therefore the installation area is small compared to when the first winding portion 21 and the second winding portion 22 are disposed in a horizontal arrangement. This is because the length of the assembly 10 in the direction orthogonal to both the direction in which the first winding portion 21 and the second winding portion 22 are arranged in parallel and the axial direction of the coil 2 is shorter than the length of the assembly 10 in the direction in which the first winding portion 21 and the second winding portion 22 are arranged in parallel.

The amount of loss is small. When the first winding portion 21 and the second winding portion 22 each have a constant height, as a result of setting the second winding portion 22 so as to have a greater width than the first winding portion 21, the distance between the side surfaces of the second winding portion 22 and the inclined surfaces 522 that face the side surfaces is more likely to be small compared to when the first winding portion 21 and the second winding portion 22 have the same width. Therefore, heat from the second winding portion 22 can more easily be dissipated. In particular, regarding each of the side surfaces of the second winding portion 22, the aforementioned minimum distance D2min is substantially the same as the aforementioned minimum distance D1min, and the aforementioned maximum distance D2max is substantially the same as the aforementioned maximum distance D1max, and therefore the first winding portion 21 and the second winding portion 22 are likely to be uniformly cooled via the side wall portion 52 of the case 5. As a result of the first winding portion 21 and the second winding portion 22 being uniformly cooled, the maximum temperature of the coil 2 is likely to be lowered. Therefore, as a result of the maximum temperature of the coil 2 being lowered, the amount of loss of the reactor 1A is likely to be reduced.

When the facing intervals between the inclined surfaces 522 of the case 5 are the same, the dead space in the case 5 is likely to be small.

Descriptions of Components including Other Characteristic Portions

Coil

Although not shown in the drawings, the conductors at the proximal ends of the coil 2 in the axial direction thereof are directly connected to each other. For example, the conductors are connected to each other by bending an end portion of the winding wire of the first winding portion 21 and extending it to an end portion of the winding wire of the second winding portion 22. Note that the conductors may be connected to each other via a connection member that is independent of the first winding portion 21 or the second winding portion 22. The coupling member is formed of the same material as the winding wires, for example. The conductors can be connected through welding or pressure welding.

On the other hand, although not shown in the drawings, the ends of the winding wires at the distal end of the coil 2 in the axial direction thereof are extended upward from the opening 55 of the case 5. The insulating coating on the end portions of each winding wire is peeled off so that the conductor thereof is exposed to the outside. A terminal member is connected to each exposed conductor. An external device such as a power supply that supplies power to the coil 2 via such a terminal member. The terminal member and the external device are omitted from the drawings.

The first winding portion 21 and the second winding portion 22 may individually be unified using a unifying resin. The unifying resin is omitted from the drawings. The unifying resin covers the outer circumferential surfaces, the inner circumferential surfaces, and the end surfaces of the first winding portion 21 and the second winding portion 22, and joins adjacent turns to each other. The unifying resin can be formed by using a resin that has a coating layer of a thermal fusion resin formed on the outer circumference of a winding wire, winding the winding wire, and thereafter heating and melting the coating layer. The outer circumference of a winding wire means the outer circumference of the insulating coating of the winding wire. Examples of types of thermal fusion resins include thermosetting resins such as an epoxy resin, a silicone resin, and an unsaturated polyester.

Magnetic Core

Material

The first inner core portion 31, the second inner core portion 32, and the outer core portions 33 are formed of a powder compact or a composite material. The powder compact is formed by performing compression molding of soft magnetic powder. With a powder compact, it is possible to increase the proportion of soft magnetic powder in the core pieces compared to a composite material. Therefore, with a powder compact, it is easier to improve the magnetic properties. Examples of magnetic properties include a relative magnetic permeability and a saturation magnetic flux density. The composite material is formed by dispersing soft magnetic powder in a resin. The composite material is obtained by filling a mold with a fluid material formed by dispersing soft magnetic powder in an unsolidified resin, and curing the resin. With a composite material, it is easy to adjust the amount of soft magnetic power contained in the resin. Therefore, with a composite material, it is easy to adjust the aforementioned magnetic properties. In addition, it is easier to form a complicated shape with a composite material than with a powder compact. Note that the first inner core portion 31, the second inner core portion 32, and the outer core portions 33 may be formed as a hybrid core in which the outer circumference of a powder compact is covered by a composite material. In this example, the first inner core portion 31 and the second inner core portion 32 are formed of a composite material. The pair of outer core portions 33 are formed of a powder compact.

Examples of the particles that constitute soft magnetic powder include soft magnetic metal particles, coated particles in which the outer circumferential surfaces of the soft magnetic metal particles are provided with an insulating coating, and soft magnetic non-metal particles. Examples of soft magnetic metals include pure iron and an iron-based alloy. Examples of iron-based alloys include an Fe—Si alloy and an Fe—Ni alloy. Examples of the insulating coating include a phosphate. Examples of soft magnetic non-metals include a ferrite. A thermosetting resin or a thermoplastic resin can be used as the resin of the composite material, for example. Examples of thermosetting resins include an epoxy resin, a phenol resin, a silicone resin, and a urethane resin. Examples of thermoplastic resins include PPS resins, polyamide (PA) resins, liquid crystal polymers (LCP), polyimide resins, and fluororesins. Examples of PA resins include a nylon 6, a nylon 66, and a nylon 9T. These resins may contain the above-described ceramic filler. The gaps are made of a material having a lower relative magnetic permeability than the first inner core portion 31, the second inner core portion 32, or the outer core portion 33.

The relative magnetic permeability of the first inner core portion 31 and the second inner core portion 32 is preferably no less than 5 and no greater than 50, more preferably no less than 10 and no greater than 30, and particularly preferably no less than 20 and no greater than 30. The relative magnetic permeability of the outer core portions 33 is preferably at least two-fold of the relative magnetic permeability of the first inner core portion 31 and the second inner core portion 32. The relative magnetic permeability of the outer core portions 33 is preferably no less than 50 and no greater than 500.

Holding Member

The assembly 10 may be provided with a holding member 4 (FIG. 1). The holding member 4 ensures insulation between the coil 2 and the magnetic core 3. The holding member 4 in this example has a pair of end surface members 41.

End Surface Members

The end surface members 41 ensure insulation between end surfaces of the coil 2 and the outer core portions 33. The end surface members 41 have the same shape. The end surface members 41 are frame-shaped plate members in which two through holes 410 are provided in the direction in which the first winding portion 21 and the second winding portion 22 are stacked. The first inner core portion 31 and the second inner core portion 32 are fitted into the through holes 410. The width of the through hole 410 into which the second inner core portion 32 is fitted is greater than the width of the through hole 410 into which the first inner core portion 31 is fitted. Two recesses 411 for accommodating the end surfaces of the first winding portion 21 and the second winding portion 22 are formed in the coil 2-side surfaces of the end surface members 41. Due to the recesses 411 on the coil 2 side, the entire end surfaces of the first winding portion 21 and the second winding portion 22 come into surface contact with the end surface members 41. The recesses 411 are formed into a rectangular ring shape so as to surround the peripheries of the through holes 410, respectively. The outer core portions 33-side surfaces of the end surface members 41 are each provided with one recess 412 into which an outer core portion 33 can be fitted.

Inner Member

Although not shown in the drawings, the holding member 4 may further include an inner member. The inner member ensures insulation between the inner circumferential surfaces of the first winding portion 21 and the second winding portion 22 and the outer circumferential surfaces of the first inner core portion 31 and the second inner core portion 32.

Material

Examples of the material of the holding member 4 include insulating materials such as various resins. Examples of resins include the same resins as in the above-described composite material. Examples of other thermoplastic resins include a polytetrafluoroethylene (PTFE) resin, a PBT resin, and an ABS resin. Examples of other thermosetting resins include an unsaturated polyester resin. In particular, it is preferable that the material of the holding member 4 is the same as the material of the sealing resin portion 8. This is because such a configuration makes it possible to make the linear expansion coefficients of the holding member 4 and the sealing resin portion 8 same, and it is possible to suppress damage to each member caused due to thermal expansion and contraction.

Mold Resin Portion

Although not shown in the drawings, the assembly 10 may include a mold resin portion. The mold resin portion covers the outer core portions 33 and extends to the inside of the first winding portion 21 and the second winding portion 22. The mold resin portion covers the outer circumferential surfaces of the outer core portions 33 except for the coupling surfaces of the first inner core portion 31 and the second inner core portion 32. The mold resin portion is interposed between the outer core portions 33 and the recesses 412 of the end surface members 41, between the outer circumferential surfaces of the first inner core portion 31 and the second inner core portion 32 and the through holes 410 of the end surface members 41, and between the inner circumferential surfaces of the first winding portion 21 and the second winding portion 22 and the outer circumferential surfaces of the first inner core portion 31 and the second inner core portion 32. This mold resin portion can integrate the outer core portions 33, the end surface members 41, and the first inner core portion 31, and the second inner core portion 32, the first winding portion 21, and the second winding portion 22, with each other. Examples of the material of the mold resin portion include the same thermosetting resins and thermoplastic resins as in the above-described composite material. These resins may contain the above-described ceramic filler. By including the ceramic filler in the mold resin portion, it is possible to improve the heat dissipation properties of the mold resin portion.

Mode of Usage

The reactor 1A can be used as a component of a circuit that performs voltage step-up and step-down operations. The reactor 1A can be used as a constituent component of various converters and power conversion devices, for example. Examples of converters include on-board converters to be mounted on vehicles such as hybrid vehicles, plug-in hybrid vehicles, electric vehicles, and fuel cell vehicles, and converters for air conditioners. Typical examples of on-board converters include a DC-DC converter.

Second Embodiment

Reactor

Figure 3:
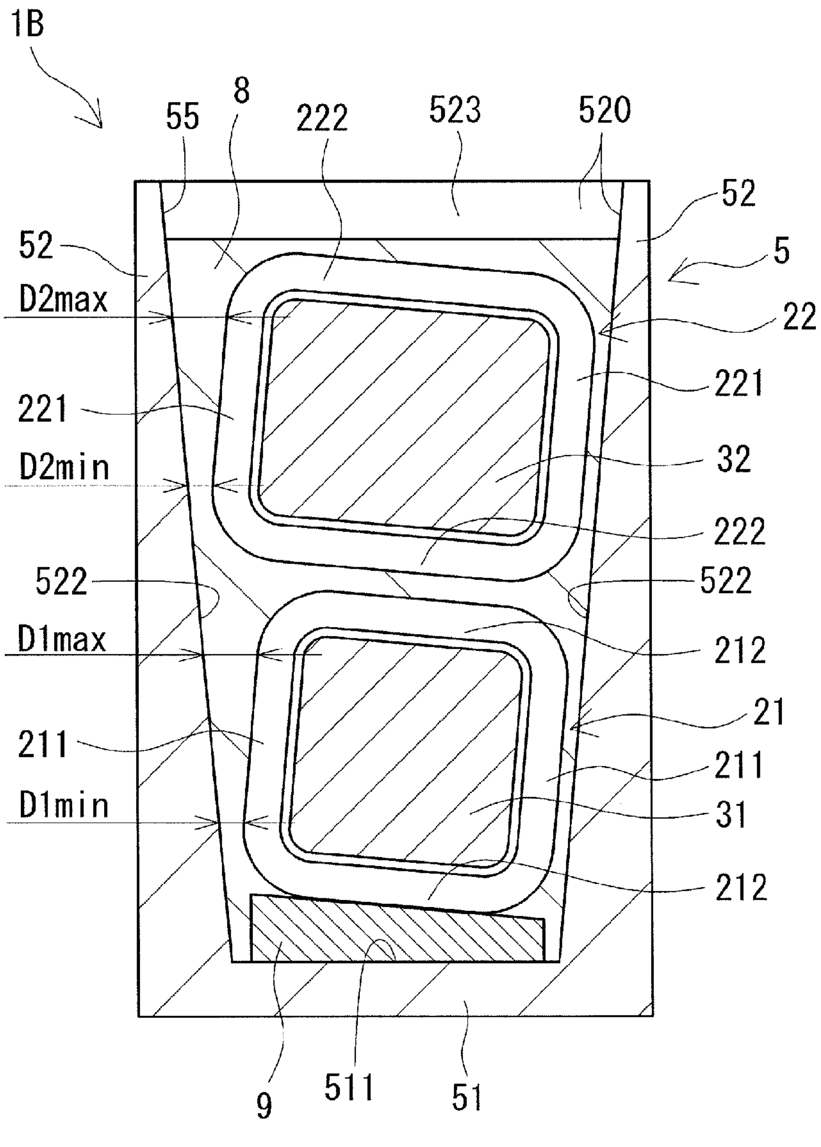
FIG. 3 is a cross-sectional view showing an overview of a reactor according to a second embodiment.

A reactor 1B according to a second embodiment will be described with reference to FIG. 3. The reactor 1B according to the second embodiment is different from the reactor 1A according to the first embodiment in that the first winding portion 21 and the second winding portion 22 are inclined so that one of the side surfaces of the first winding portion 21 and the second winding portion 22 (on the right side of the drawing sheet of FIG. 3) and one of the inclined surfaces 522 are parallel with each other. The following mainly describes this difference. Descriptions of the same components will be omitted. The same applies to the third embodiment described below. FIG. 3 is a cross-sectional view showing the reactor 1B cut along the same position as in the cross-sectional view in FIG. 2.

Coil

One of the case facing sides 211 of the first winding portion 21 is parallel with one of the inclined surfaces 522. The other of the case facing sides 211 of the first winding portion 21 is not parallel with the other of the inclined surfaces 522. The pair of coupling sides 212 of the first winding portion 21 are not parallel with the inner bottom surface 511. The pair of coupling sides 212 are orthogonal to one of the inclined surfaces 522, and are not orthogonal to the other of the inclined surfaces 522. Similarly, one of the case facing sides 221 of the second winding portion 22 is parallel with one of the inclined surfaces 522. The other of the case facing sides 221 of the second winding portion 22 is not parallel with the other of the inclined surfaces 522. The pair of coupling sides 222 of the second winding portion 22 are not parallel with the inner bottom surface 511. The pair of coupling sides 222 are orthogonal to one of the inclined surfaces 522, and are not orthogonal to the other of the inclined surfaces 522. That is to say, the pair of case facing sides 211 of the first winding portion 21 and the pair of case facing sides 221 of the second winding portion 22 have the same length. The length of the pair of coupling sides 222 of the second winding portion 22 is greater than the length of the pair of coupling sides 212 of the first winding portion 21.

It is possible to make the distance between one of the side surfaces of the first winding portion 21 and one of the inclined surfaces 522 uniform, from the inner bottom surface 511 side to the opening 55 side (on the right side of the drawing sheet of FIG. 3). Similarly, it is possible to make the distance between one of the side surfaces of the second winding portion 22 and one of the inclined surfaces 522 uniform, from the inner bottom surface 511 side to the opening 55 side. Also, the distance between one of the side surfaces of the first winding portion 21 and one of the inclined surfaces 522 and the distance between one of the side surfaces of the second winding portion 22 and one of the inclined surfaces 522 can be made uniform. Therefore, the first winding portion 21 and the second winding portion 22 are likely to be uniformly cooled via the side wall portion 52 of the case 5.

In this example, one of the side surfaces of the first winding portion 21 and one of the side surfaces of the second winding portion 22 are in surface contact with one of the inclined surfaces 522 (on the right side of the drawing sheet of FIG. 3). Therefore, the first winding portion 21 and the second winding portion 22 are even more likely to be cooled. In FIG. 3, for the sake of illustration, a gap is provided between one of the side surfaces of each of the first winding portion 21 and the second winding portion 22 and one of the inclined surfaces 522. However, one of the side surfaces of each of the first winding portion 21 and the second winding portion 22 and one of the inclined surfaces 522 are directly in contact with each other.

The other of the side surfaces of the first winding portion 21 and the other of the side surfaces of the second winding portion 22 are not in contact with the other of the inclined surfaces 522 (on the left side of the drawing sheet of FIG. 3). A predetermined gap is provided between the other of the side surfaces of the first winding portion 21 and the other of the inclined surfaces 522 and between the other of the side surfaces of the second winding portion 22 and the other of the inclined surfaces 522. The distance between the other of the side surfaces of the first winding portion 21 and the other of the inclined surfaces 522 gradually increases in a direction from the inner bottom surface 511 side to the opening 55 side. Similarly, the distance between the other of the side surfaces of the second winding portion 22 and the other of the inclined surfaces 522 gradually increases in a direction from the inner bottom surface 511 side to the opening 55 side.

That is to say, the aforementioned minimum distance D1min is the distance between the other of the side surfaces of the first winding portion 21 on the inner bottom surface 511 side and the other of the inclined surfaces 522 in the width direction. The aforementioned maximum distance D1max is the distance between the other of the side surfaces of the first winding portion 21 on the opening 55 side and the other of the inclined surfaces 522 in the width direction. Similarly, the aforementioned minimum distance D2min is the distance between the other of the side surfaces of the second winding portion 22 on the inner bottom surface 511 side and the other of the inclined surfaces 522 in the width direction. The aforementioned maximum distance D2max is the distance between the other of the side surfaces of the second winding portion 22 on the opening 55 side and the other of the inclined surfaces 522 in the width direction. The aforementioned minimum distance D1min and the aforementioned minimum distance D2min are substantially the same. Similarly, the aforementioned maximum distance D1max and the aforementioned maximum distance D2max are substantially the same. Therefore, heat from the second winding portion 22 can more easily be dissipated. Therefore, the first winding portion 21 and the second winding portion 22 are likely to be uniformly cooled via the side wall portion 52 of the case 5.

Seat Portion

It is preferable that the reactor 1B is provided with a seat portion 9. The seat portion 9 is disposed on the inner bottom surface 511 of the bottom plate portion 51. The seat portion 9 is placed on the inner bottom surface 511 of the bottom plate portion 51 in a state where the first winding portion 21 and the second winding portion 22 are inclined. The seat portion 9 makes one of the case facing sides 211 of the first winding portion 21 and one of the case facing sides 221 of the second winding portion 22 be parallel with one of the inclined surfaces 522. That is to say, the upper surface of the seat portion 9 in this example is a surface that extends in a direction that is orthogonal to one of the inclined surfaces 522.

The seat portion 9 in this example is formed as a member separate from the case 5. The seat portion 9 is formed of a sheet-shaped member that substantially supports the entire range of the lower surface of the first winding portion 21. The cross-sectional shape of the seat portion 9 is a right-angled trapezoidal shape. The upper surface of the seat portion 9 is formed as an inclined surface. The height of the seat portion 9 gradually increases in a direction from one of the inclined surfaces 522 to the other of the inclined surfaces 522. In addition, the seat portion 9 may be formed as a protruding member that supports one end side of the lower surface of the first winding portion 21 in the width direction in the axial direction of the first winding portion 21. Note that the seat portion 9 may be constituted by a portion of the case 5. When the seat portion 9 is constituted by a portion of the case 5, the inner bottom surface 511 may be constituted by the aforementioned inclined surface, for example.

As with the material of the case 5, examples of the material of the seat portion 9 include non-magnetic metals and non-metallic materials. When the seat portion 9 is formed of such a material, heat from the first winding portion 21 is more likely to be conducted to the bottom plate portion 51 of the case 5 via the seat portion 9. Therefore, the first winding portion 21 is more likely to be cooled. When the case 5 is formed of a non-magnetic metal, the seat portion 9 may be formed as a non-magnetic metal sheet whose upper surface is coated with a non-metallic material. Such a configuration improves insulation between the first winding portion 21 and the case 5.

Actions and Effects

The reactor 1B according to the second embodiment is a low loss reactor. This is because the first winding portion 21 and the second winding portion 22 are inclined so that one of the side surfaces of the first winding portion 21 and the second winding portion 22 and one of the inclined surfaces 522 are in surface contact with each other, and the second winding portion 22 is more likely to be cooled via the one of the side surfaces. In addition, regarding the other of the side surfaces of the second winding portion 22, the aforementioned minimum distance D2min is substantially the same as the aforementioned minimum distance D1min, and the aforementioned maximum distance D2max is substantially the same as the aforementioned maximum distance D1max, and therefore heat from the second winding portion 22 is likely to be dissipated from the other of the side surfaces as well. Therefore, the first winding portion 21 and the second winding portion 22 are likely to be uniformly cooled via the side wall portion 52 of the case 5, and the maximum temperature of the coil 2 is likely to be lowered.

Third Embodiment

Reactor

Figure 4:
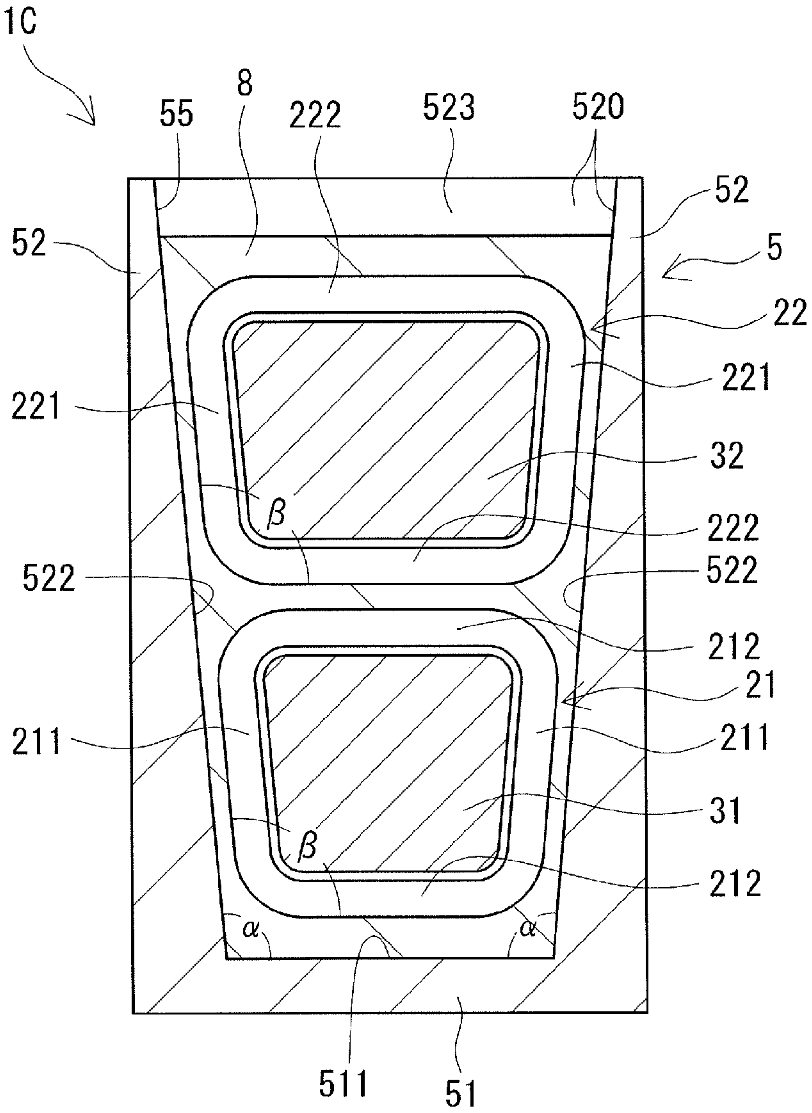
FIG. 4 is a cross-sectional view showing an overview of a reactor according to a third embodiment.

A reactor 1C according to a third embodiment will be described with reference to FIG. 4. The reactor 1C according to the third embodiment is different from the reactor 1A according to the first embodiment in the shapes of the first winding portion 21 and the second winding portion 22. FIG. 4 is a cross-sectional view showing the reactor 1C cut along the same position as in the cross-sectional view in FIG. 2.

Coil

The shape of the end surfaces of the first winding portion 21 and the second winding portion 22 is an isosceles trapezoidal frame shape. The corners of the first winding portion 21 and the second winding portion 22 are rounded.

The end surface of the first winding portion 21 is shaped so as to include a pair of case facing sides 211 and a pair of coupling sides 212. One of the case facing sides 211 is parallel with one of the inclined surfaces 522. The other of the case facing sides 211 is parallel with the other of the inclined surfaces 522. The coupling sides 212 are parallel with the inner bottom surface 511 of the bottom plate portion 51. The coupling sides 212 extend in the width direction of the case 5. That is to say, the angle (angle ß) formed by each of the case facing sides 211 and the lower coupling side 212 is the same as the angle (angle α) formed by the inner bottom surface 511 and the inclined surfaces 522.

Similarly, the end surface of the second winding portion 22 is shaped so as to include a pair of case facing sides 221 and a pair of coupling sides 222. One of the case facing sides 221 is parallel with one of the inclined surfaces 522. The other of the case facing sides 221 is parallel with the other of the inclined surfaces 522. The coupling sides 222 are parallel with the inner bottom surface 511 of the bottom plate portion 51. The coupling sides 222 extend in the width direction of the case 5. That is to say, the angle (angle ß) formed by each of the case facing sides 221 and the lower coupling side 222 is the same as the angle (angle α) formed by the inner bottom surface 511 and the inclined surfaces 522.

The first winding portion 21 and the second winding portion 22 have the same height in this example. That is to say, the pair of case facing sides 211 of the first winding portion 21 and the pair of case facing sides 221 of the second winding portion 22 have the same length.

The width of the second winding portion 22 is greater than the width of the first winding portion 21. In the case of a trapezoidal frame shape, "the width is greater" means that the width of the second winding portion 22 on the inner bottom surface 511 side is greater than the width of the first winding portion 21 on the opening 55 side. That is to say, the length of the lower coupling side 222 of the second winding portion 22 is greater than the length of the upper coupling side 212 of the first winding portion 21.

The distance between one of the side surfaces of the first winding portion 21 and one of the inclined surfaces 522 is uniform, from the inner bottom surface 511 side to the opening 55 side. The distance between one of the side surfaces of the first winding portion 21 and one of the inclined surfaces 522 is uniform, from the inner bottom surface 511 side to the opening 55 side. The distance between one of the side surfaces of the first winding portion 21 and one of the inclined surfaces 522 is substantially the same as the distance between the other of the side surfaces of the first winding portion 21 and the other of the inclined surfaces 522.

Similarly, the distance between one of the side surfaces of the second winding portion 22 and one of the inclined surfaces 522 is uniform, from the inner bottom surface 511 side to the opening 55 side. The distance between the other of the side surfaces of the second winding portion 22 and the other of the inclined surfaces 522 is uniform, from the inner bottom surface 511 side to the opening 55 side. The distance between one of the side surfaces of the second winding portion 22 and one of the inclined surfaces 522 is substantially the same as the distance between the other of the side surfaces of the second winding portion 22 and the other of the inclined surfaces 522.

The distance between the side surfaces of the first winding portion 21 and the inclined surfaces 522 is substantially the same as the distance between the side surfaces of the second winding portion 22 and the inclined surfaces 522.

Magnetic Core

Inner Core Portions

The first inner core portion 31 and the second inner core portion 32 are rectangular columnar members that have isosceles trapezoid shapes that respectively match the shape of the inner circumference of the first winding portion 21 and the shape of the inner circumference of the second winding portion 22. The distance between the first winding portion 21 and the first inner core portion 31 is uniform in the circumferential direction of the first inner core portion 31. Similarly, the distance between the second winding portion 22 and the second inner core portion 32 is uniform in the circumferential direction of the second inner core portion 32.

The first inner core portion 31 and the second inner core portion 32 have the same height. The second inner core portion 32 has a greater width than the first inner core portion 31. "The second inner core portion 32 has a greater width" means that the width of the second inner core portion 32 on the inner bottom surface 511 side is greater than the width of the first inner core portion 31 on the opening 55 side. The width of the first inner core portion 31 and the width of the second inner core portion 32 in this example are set such that the distance between the first winding portion 21 and the first inner core portion 31 is substantially the same as the distance between the second winding portion 22 and the second inner core portion 32.

Actions and Effects

The amount of loss of the reactor 1C according to the third embodiment is even smaller than that of the reactor 1A according to the first embodiment. This is because the distance between the side surfaces of the first winding portion 21 and the inclined surfaces 522 and the distance between the side surfaces of the second winding portion 22 and the inclined surfaces 522 are uniform, and the distance between the side surfaces of the first winding portion 21 and the inclined surfaces 522 is substantially the same as the distance between the side surfaces of the second winding portion 22 and the inclined surfaces 522, and therefore the second winding portion 22 is even more likely to be cooled. Therefore, the first winding portion 21 and the second winding portion 22 are likely to be uniformly cooled via the side wall portion 52 of the case 5, and the maximum temperature of the coil 2 is likely to be lowered. Also, in the reactor 1C according to the third embodiment, when the facing intervals between the inclined surfaces 522 of the case 5 are the same, the dead space in the case 5 can easily be reduced compared to the reactor 1A according to the first embodiment.

The present disclosure is not limited to these examples, is indicated by the claims, and is intended to include all modifications within the meaning and scope of the claims. For example, the shape of the end surface of the first winding portion and that of the second winding portion may be different from each other. The shape of the end surface of the first winding portion may be a rectangular frame shape, and the shape of the end surface of the second winding portion may be a trapezoidal frame shape such as an isosceles trapezoidal shape.

The invention claimed is:

1. A reactor comprising: an assembly of a coil and a magnetic core; a case that houses the assembly; and a sealing resin portion that is filled into the case to seal at least a portion of the assembly, wherein the case has an inner bottom surface on which the assembly is placed, and a pair of coil facing surfaces that face side surfaces of the coil, the pair of coil facing surfaces respectively have inclined surfaces that are inclined away from each other in a direction from the inner bottom surface side to an opposite side to the inner bottom surface, the coil includes a first winding portion that is disposed on the inner bottom surface side, and a second winding portion that is disposed on an opposite side of the inner bottom surface with respect to the first winding portion, the first winding portion and the second winding portion are disposed in a vertical arrangement such that axes thereof are parallel with each other, and the second winding portion has a greater width than the first winding portion.

2. The reactor according to claim 1, wherein the inner bottom surface is a flat surface, end surfaces of the first winding portion and the second winding portion each have a rectangular frame shape, and each have a pair of case facing sides that face the inclined surfaces and extend in a vertical direction, and a pair of coupling sides that couple respective proximal ends and respective distal ends of the pair of case facing sides to each other, and the pair of coupling sides are parallel with the inner bottom surface.

3. The reactor according to claim 2, wherein the magnetic core includes a first inner core portion and a second inner core portion that are respectively disposed inside the first winding portion and the second winding portion, cross-sectional shapes of the first inner core portion and the second inner core portion cut along cross sections that are orthogonal to magnetic flux in the inner core portions respectively match shapes of inner circumferences of the first winding portion and the second winding portion, and the second inner core portion has a greater width than the first inner core portion.

4. The reactor according to claim 2, wherein an angle formed by the inner bottom surface and each of the inclined surfaces is no less than 91° and no greater than 95°.

5. The reactor according to claim 1, wherein end surfaces of the first winding portion and the second winding portion each have a rectangular frame shape, and each have a case facing side that faces, and is parallel with, one of the inclined surfaces, and another case facing side that faces, and is not parallel with, the other of the inclined surfaces.

6. The reactor according to claim 5, wherein the magnetic core includes a first inner core portion and a second inner core portion that are respectively disposed inside the first winding portion and the second winding portion, cross-sectional shapes of the first inner core portion and the second inner core portion cut along cross sections that are orthogonal to magnetic flux in the inner core portions respectively match shapes of inner circumferences of the first winding portion and the second winding portion, and the second inner core portion has a greater width than the first inner core portion.

7. The reactor according to claim 5, wherein an angle formed by the inner bottom surface and each of the inclined surfaces is no less than 91° and no greater than 95°.

8. The reactor according to claim 1, wherein end surfaces of the first winding portion and the second winding portion each have a trapezoidal frame shape, and each have a pair of case facing sides that face, and are parallel with, the inclined surfaces.

9. The reactor according to claim 8, wherein the magnetic core includes a first inner core portion and a second inner core portion that are respectively disposed inside the first winding portion and the second winding portion, cross-sectional shapes of the first inner core portion and the second inner core portion cut along cross sections that are orthogonal to magnetic flux in the inner core portions respectively match shapes of inner circumferences of the first winding portion and the second winding portion, and the second inner core portion has a greater width than the first inner core portion.

10. The reactor according to claim 8, wherein an angle formed by the inner bottom surface and each of the inclined surfaces is no less than 91° and no greater than 95°.

11. The reactor according to claim 1, wherein the magnetic core includes a first inner core portion and a second inner core portion that are respectively disposed inside the first winding portion and the second winding portion, cross-sectional shapes of the first inner core portion and the second inner core portion cut along cross sections that are orthogonal to magnetic flux in the inner core portions respectively match shapes of inner circumferences of the first winding portion and the second winding portion, and the second inner core portion has a greater width than the first inner core portion.

12. The reactor according to claim 11, wherein an angle formed by the inner bottom surface and each of the inclined surfaces is no less than 91° and no greater than 95°.

13. The reactor according to claim 1, wherein an angle formed by the inner bottom surface and each of the inclined surfaces is no less than 91° and no greater than 95°.

* * * * *